(12) United States Patent
DeStephen et al.

(10) Patent No.: US 6,251,448 B1
(45) Date of Patent: Jun. 26, 2001

(54) CHOCOLATE OR COMPOUND COATING WITH UNIQUE TEXTURE

(75) Inventors: Stephen DeStephen; Christopher Budwig, both of Columbus; Eric Best, Dublin, all of OH (US)

(73) Assignee: Nestec SA, Vevey (CH)

( * ) Notice: Subject to any disclaimer, the term of this patent is extended or adjusted under 35 U.S.C. 154(b) by 0 days.

(21) Appl. No.: 09/501,531

(22) Filed: Feb. 9, 2000

Related U.S. Application Data

(60) Provisional application No. 60/121,182, filed on Feb. 22, 1999.

(51) Int. Cl.$^7$ ................................. A23G 1/00; A23P 1/08
(52) U.S. Cl. .............................. 426/93; 426/99; 426/631
(58) Field of Search ..................................... 426/804, 631, 426/93, 99

(56) References Cited

U.S. PATENT DOCUMENTS

| | | | |
|---|---|---|---|
| 3,849,395 | 11/1974 | Moirano | 260/209 |
| 4,849,233 | * 7/1989 | Hemker | 426/93 |
| 4,933,190 | * 6/1990 | Cherukuri | 426/5 |
| 4,981,698 | * 1/1991 | Cherukuri et al. | 426/5 |
| 5,023,093 | * 6/1991 | Cherukuri | 426/3 |
| 5,059,416 | * 10/1991 | Cherukuri | 424/48 |
| 5,192,569 | 3/1993 | McGinley et al. | 426/96 |
| 5,266,335 | * 11/1993 | Cherukuri | 426/3 |
| 5,393,550 | * 2/1995 | Tarr et al. | 426/573 |
| 5,437,879 | * 8/1995 | Kabose | 426/5 |
| 5,470,391 | * 11/1995 | Mallee et al. | 127/38 |
| 5,532,022 | * 7/1996 | Miller | 426/660 |
| 5,589,215 | * 12/1996 | Tang | 426/549 |
| 5,607,716 | * 3/1997 | Doherty | 426/660 |
| 5,770,248 | * 6/1998 | Leibfred | 426/93 |

FOREIGN PATENT DOCUMENTS

| | | |
|---|---|---|
| 0 204 941 | 12/1986 | (EP) . |
| 434025 | 6/1991 | (EP) . |
| 515864 | 12/1992 | (EP) . |
| 522704 | 1/1993 | (EP) . |
| WO 91/19424 | 12/1991 | (WO) . |
| WO 93/17582 | 9/1993 | (WO) . |
| WO 96/22696 | 8/1996 | (WO) . |
| WO 97/00617 | 1/1997 | (WO) . |

OTHER PUBLICATIONS

McCance, R.A. and Widdowson, E.M., *The Composition of Foods*, H.M.S.O., London, 1960, pp. 100–101.

\* cited by examiner

*Primary Examiner*—Carolyn Paden
(74) *Attorney, Agent, or Firm*—Winston & Strawn

(57) ABSTRACT

The present invention relates to the production of chocolates and compound coatings having a unique texture and mouthfeel while being eaten. The chocolates and compound coatings include hydrocolloids.

11 Claims, No Drawings

CHOCOLATE OR COMPOUND COATING WITH UNIQUE TEXTURE

This application claims benefit of U.S. Provisional Application No. 60/121,182, filed Feb. 22, 1999.

TECHNICAL FIELD

The present invention relates to the production of chocolates and compound coatings having a unique texture and mouthfeel while being eaten.

BACKGROUND ART

In order to make a candy product that is palatable to the consumer, the texture or mouthfeel of the candy product is often varied. For example, foaming confectionary products are available. This method of varying the mouthfeel of the product depends on the reaction of two ingredients, such as an acid and sodium bicarbonate, when the product is placed in the mouth.

Candy products containing chocolate or compound coatings are well known. Compound coatings having a chocolate flavor are commonly used as a replacement for chocolate in candy products, mainly for cost or price reasons but also so that the texture or mouthfeel of compound coatings may be varied.

The texture of the compound coating is typically varied by varying the melting profile of the fat used in the compound coating. The melting profile of the fat can be changed by varying the type of fat used, the level of hydrogenation of the fat, fractionation of the fat and/or esterification of the fat. In addition, the texture of the confectionary coating can be varied by varying the amount and/or kind of emulsifier.

Flavored compound coatings often do not have the texture of the product whose flavor they exhibit. For example, peanut butter flavored compound coatings often lack the cloyiness or sticky texture of real peanut butter.

Hydrocolloids have been used in the food industry as a thickening agent and stabilizing agent in a variety of food products. For example, hydrocolloids are used in salad dressings and pectin jellies. The hydrocolloids are also useful in preparing low fat or no fat confections. In all these uses the hydrocolloids are present in water based food products and exist in their hydrated state. However, water can cause problems in chocolate or compound coatings.

For example U.S. Pat. No. 5,607,716 discloses a "water and sugar based" confection which is a caramel and includes hydrocolloids. Other foodstuffs referred to include fudge, nougat, toffee, creams, gums and jellies. All these products are water based materials.

WO 93/17,582 discloses edible dispersions used as a fat substitute. The product has continuous and gel dispersed phase containing hydrocolloids. The gel is formed from an aqueous solution.

European Patent No. 522,704 discloses hydrated micro particles of cocoa dispersed in an aqueous sugar solution that can be used, for example, as a low fat icing.

European Patent No. 515,864 discloses a water and sugar based high solids confectionary useful in foodstuffs such as confectionary products and jellies, especially low fat and no fat confections.

WO 91/19,424 discloses a fat substitute comprising micro-particulate beads of hydrous hydrocolloid gel. The micro-particulate beads may be used as a fat substitute for ice cream, pudding, cheesecake, dips, salad dressings and the like.

European Patent No. 434,025 discloses the preparation of crispies by extrusion of a hydrocolloid and/or raw fiber, oat bran, sugar substitute, starch and wheat flour. The crispies product initially has a high moisture content and is dried to a final moisture content of 4 percent. The crispies may be coated with chocolate.

U.S. Pat. No. 3,849,395 discloses modified hydrocolloids useful as a suspending or gelling agent for chocolate syrup or fruit syrups. However, chocolate, milk or plain, or compound coatings only contain a trace of water. This, is declared in McCance, R. A., Widdowson, E. M., 1960, "The Composition of Foods," H.M.S.O., London, pp. 100–101. This is because chocolate and compound coatings cannot tolerate moisture for the reasons of texture, stability, and microbiological safety.

As noted above, flavored compound coatings often do not have the texture of the product whose flavor they exhibit. Thus, there is a need for compound coatings which provide a texture more like the product whose flavor they exhibit. In addition, it is desirable to make candy products having unique and novel textures that are attractive to consumers. The present invention provides such products.

SUMMARY OF THE INVENTION

The present invention relates to a chocolate or compound coating having a unique texture and mouthfeel. The chocolate or compound coating includes a hydrocolloid in an amount sufficient to modify the texture or mouthfeel of the composition.

Preferably, the hydrocolloid is a functional protein, a gum, a gel, a cellulosic material, a glucan, a starch, a clay or a mixture thereof. More preferably, the hydrocolloid is a gelatin, a carrageenan, a pectin, a cellulose, an alginate, a xanthan, or a mixture thereof, and most preferably is guar gum.

Advantageously, the hydrocolloid is present in an amount from about 0.1 percent to about 20 percent by weight of the composition, preferably from about 1 percent to about 10 percent by weight of the composition. The hydrocolloid has a particle size of between about 50 $\mu$m and about 500 $\mu$m, preferably, between about 70 $\mu$m and about 250 $\mu$m, and most preferably between about 80 $\mu$m and about 180 $\mu$m.

The chocolate or compound coating may have a moisture content of no more than about 5 weight percent, and preferably no more than about 2 weight percent.

DETAILED DESCRIPTION OF THE PREFERRED EMBODIMENTS

It has been surprisingly discovered that combining hydrocolloids with chocolate or compound coatings produces a product with a unique texture and mouthfeel when eaten.

By hydrocolloid is meant those substances which influence the physical properties of water. In particular, hydrocolloids are substances that swell and produce a viscous dispersion or solution when exposed to water. Hydrocolloids include functional proteins such as, gelatin, myosin, sarcoplasmic proteins, albumens, and globulins; gums, such as, galactomannans, glucomannans, and microbials; gels, such as, seaweed extracts, pectinaceous materials, and konjacs;

and other macromolecular entities such as, cellulosics, glucans, starches, and clays.

Hydrocolloids which may be added to the chocolate or compound coating according to the present invention include, but are not limited to, acacia, acetan, acetylated distarch phosphate, acetylated starch, acid-thinned starch, adipic starch, agar (agar-agar), agaropectin, agarose, algin, alginate, alginic acid, amidated pectins, amorphophallus, amylopectin, amylopectin starch, amylose, arabic, arabica, arabinogalactan, arabogalactan, arracacha, arrowroot, beet pulp, beta glucan, bevo, British gum, cactus gum, carboxymethylethyl starches, carboxymethylcellulose, carboxymethylethylcellulose, carboxymethyl starch, cassia, chitin, chitosan, clay, collagen, combretum, curdlan, cydonia, Danish agar, dextran, dextrin, dulsan, distarch phosphate, ethylcellulose, ethylhydroxyethylcellulose, ethylmethylcellulose, eucheumas, ferlo, fibrinogen, flax seed, fucoidan, furcelleran, funoran, galactomannans, gatto, gelidium, gellan, ghatti, gigartinas, glucomannans, gluten, gracilarias, guluronics, gummifera, hashab, hemicelluloses, high amylose starch, hoblobo, hydrogenated starch, hydroxyalkylcellulose, hydroxyalkyl starch, hydroxyethylcellulose, hydroxyethylmethylcellulose, hydroxypropylcellulose, hydroxypropylmethylcellulos, hydroxypropyl starch, hypnean, iota carrageenan, iridaeans, isinglass, karaya, karroo, kelp, keltzan, konjac, kordofan, lakee, lambda carrageenan, laminaran, larch gum, linseed, locust bean, lupo, luposol, mannan, mannoglucuronoglycans, mannuronics, maracuya, mesquite, methylcellulose, microcrystalline cellulose, mucilage, mucin, mung bean, okra, oxidised starch, pea starch, pectic acid, plant exudates, potato pulp, potato starch, pregelatinized starches, propylated starch, propylene glycol alginate, prosopis seed, prosopis exudate, protopectins, prowashonupana barley, pullulan, psyllium, pyrodextrins, quince, quince seed, ramalin, rhamsam, St. Johns bread, salabreda, sandra beida, schizophyllan, scleroglycan, seaweed powders, semen cydonia, senna, seyal, sorghum, sterculia, suakim, succinoglycan, sunflower pectin, sunt, tahl, tahla, tamarind seed, tamarind kernel, taminda, tapioca, tara, tragacanth, undaria, verek, wattles, waxy maize, waxy rice, waxy sorghum, xyloglucan, yeast cell walls, and mixtures thereof. Preferably the hydrocolloid is a seaweed extract, a tree exudate, a cellulose ether, a pregelatinized starch, a galactomannan, a glucomannan, a xanthan, or mixtures thereof. Preferably, the hydrocolloid is guar gum.

By chocolate is meant any confectionary product having qualities sufficient to impart chocolate taste and character. Suitable chocolates include, but are not limited to, sweet chocolate, milk chocolate, buttermilk chocolate, milk chocolate, bittersweet chocolate and chocolates as defined in 21 C.F.R. § 163. Chocolate also includes compound coatings that have a chocolate flavor and any other material that performs as a chocolate analogue or a chocolate substitute.

By character is meant the texture, mouthfeel, and melting attributes of the confectionary product.

By compound coating is meant any confectionary product based on vegetable fat. In addition to vegetable fat the confectionary coatings typically contain sugar; flavorings such as cocoa solids, peanut solids, and other natural or artificial flavors; emulsifiers; coloring agents; and optionally milk solids.

By varying the amount of hydrocolloid present in the chocolate or compound coating the texture of the product can be varied over a wide range. Increasing the amount of hydrocolloid present in the chocolate or compound coating increases the viscosity of the product during eating and thus, varies the mouthfeel of the product. For example, varying the amount of hydrocolloid added to the chocolate or compound coating can lead to a product that has a slightly thickened texture, a chewy texture or even a slimy texture. Typically the hydrocolloid is present in the chocolate or compound coating in an amount from about 0.1 to 20 percent by weight. Preferably, the hydrocolloid is present from about 1 to 10 percent by weight.

Adding the hydrocolloid directly to chocolate varies the textural eating qualities of the chocolate. For example, adding from about 1 to 3 percent by weight guar gum to chocolate provides slight thickening to the chocolate during mastication, while adding from about 3 to 6 percent by weight of guar gum provides a chocolate with a slimy texture and mouthfeel. Increasing the level of guar gum in the chocolate to from about 6 to 9 weight percent gives a product with a chewy texture.

The hydrocolloids may also be added to compound coatings. The hydrocolloid is typically added to a compound coating in an amount from about 1 to 10 weight percent, preferably in an amount from about 2 to 8 weight percent and most preferably in an amount from 3 to 5 weight percent. For example, adding hydrocolloids to peanut butter flavored compound coatings imparts a mouthfeel more like actual peanut butter. The addition of about 3 to 5 percent by weight of guar gum to a peanut butter flavored confectionary coating made of vegetable fat, milk solids, sugar, salt and peanut solids has a more sticky texture and a mouthfeel more like real peanut butter.

The unique texture and mouthfeel of the product results from the hydrocolloid being wetted by saliva during mastication. Hydration of the hydrocolloid by the saliva during chewing produces a slow build up in the viscosity of the product which provides the unique mouthfeel. Thus, the presence of hydrocolloids in chocolate or compound coatings provides a texture transformation that takes place while the candy product is being eaten. This unique mouthfeel is not attainable by other methods used to vary the texture of chocolate and compound coatings. Thus, the present invention provides chocolate and compound coatings having a novel mouthfeel and an eating quality previously not obtainable.

The mouthfeel of the chocolate or compound coating is also dependent on the size of the hydrocolloid particles that are mixed with the chocolate or compound coating. Thus, the texture of the chocolate or compound coating can be further varied by choosing a specific particle size of the hydrocolloid. The rate of hydration of the hydrocolloid, and thus the texture and mouthfeel of the product, is dependent on the size of the hydrocolloid particles. Larger particles are hydrated more slowly than smaller particles. The particle size may range from about 50 $\mu$m to 500 $\mu$m, preferably from about 70 $\mu$m to 250 $\mu$m, and most preferably from about 80 $\mu$m to 180 $\mu$m.

In order to assure that the hydrocolloid is hydrated while being chewed it is necessary to minimize hydration of the colloid before the product is placed in the mouth. To minimize hydration of the hydrocolloid the hydrocolloid is preferably added to a chocolate or compound coatings having a low moisture content. Typically, the chocolate or compound coating has a moisture content of less than 5 percent and preferably less than 2 percent.

The hydrocolloid may be added to the chocolate or confectionary product at any time during the manufacturing process and no special process methods are necessary. However, care should be taken to avoid exposing the hydrocolloid to moisture. Thus, it is desirable that the humidity be kept low during the manufacturing process. To minimize exposure to moisture it is preferable to add the hydrocolloid to the chocolate or confectionary product at the end of the manufacturing process.

The chocolate or compound coating containing the hydrocolloid may be manufactured into individual candy products, used as an inclusion in candy products, or used as a coating on a candy bar. One of ordinary skill in the art may readily envision a variety of such ways to use the chocolate or compound coatings in candy products.

EXAMPLES

The invention is further defined by reference to the following examples describing in detail the compositions of the present invention. The examples are representative, and should not be construed to limit the scope of the invention in any way.

Example 1

Compound coating Prepared According to the Present Invention

A confectionary coating according to the present invention was prepared as set forth below:

| Product Composition | Weight Percent |
| --- | --- |
| Sucrose | 53.99% |
| Non-fat Dry Milk | 8.94% |
| Guar Gum | 7.49% |
| Vegetable Fat | 29.41% |
| Vanillin | 0.03% |
| Lecithin | 0.15% |

Guar gum (Procol G-2, commercially available from Polypro International Inc. of Edina, Minn.) was added at the beginning of the process to make the confectionary coating. Sugar, non-fat dry milk, guar gum, vegetable fat, and vanilla were mixed and refined through a 3-roll refiner. More vegetable fat was added to the refined mass and the product was conched in the same fashion as chocolate. The viscosity of the conched mass was adjusted using lecithin. The resulting product had a somewhat slimy texture when eaten. This product demonstrated that guar gum could be hydrated in the mouth. The example also demonstrated that guar gum can be added at the initial stages of the manufacturing process.

Example 2

Chocolate Flavored Compound Coating Prepared According to the Present Invention.

Three chocolate flavored confectionary coatings, according to the present invention, having differing levels of guar gum, were prepared as set forth below:

| Product Composition | Weight Percent | | |
| --- | --- | --- | --- |
| | Sample 1 | Sample 2 | Sample 3 |
| Sugars | 51.70 | 50.64 | 49.59 |
| Non-fat Dry Milk | 9.70 | 9.50 | 9.30 |
| Cocoa Powder | 7.11 | 6.97 | 6.82 |
| vegetable Fats | 29.35 | 28.75 | 28.15 |
| Flavors | 0.02 | 0.02 | 0.02 |
| Emulsifier | 0.13 | 0.12 | 0.12 |
| Guar Gum | 2.00 | 4.00 | 6.00 |
| Total | 100 | 100 | 100 |

The chocolate flavored confectionary coating were prepared without guar gum. The confectionary coating was then melted and the guar gum (Procol G-2) was added and hand mixed using a spatula. The product was molded into tablets for evaluation.

An increase in mouth viscosity was noted in all cases compared to product not containing guar gum. The product became more viscous in the mouth as the level of guar gum increased. This example, demonstrated that the guar gum can be added at the end of the manufacturing process.

What is claimed is:

1. A chocolate or compound coating comprising a substantially non-hydrated hydrocolloid in an amount sufficient to modify the texture or mouthfeel of the composition when the chocolate or compound coating is eaten.

2. The chocolate or compound coating of claim 1, wherein the hydrocolloid is a functional protein, a gum, a gel, a cellulosic material, a glucan, a starch, a clay or a mixture thereof.

3. The chocolate or compound coating of claim 1, wherein the hydrocolloid is a seaweed extract, a tree exudate, a cellulose ether, a pregelatinized starch, a galactomannan, a glucomannan, a xanthan, or mixtures thereof.

4. The chocolate or compound coating of claim 1, wherein the hydrocolloid is guar gum.

5. The chocolate or compound coating of claim 1, wherein the hydrocolloid is present in an amount from about 0.1 percent to about 20 percent by weight of the composition.

6. The chocolate or compound coating of claim 1, wherein the hydrocolloid is present in an amount from about 1 percent to about 10 percent by weight of the composition.

7. The chocolate or compound coating of claim 1, wherein the hydrocolloid has a particle size of between about 50 $\mu$m and about 500 $\mu$m.

8. The chocolate or compound coating of claim 1, wherein the hydrocolloid has a particle size of between about 70 $\mu$m and about 250 $\mu$m.

9. The chocolate or compound coating of claim 1, wherein the hydrocolloid has a particle size of between about 80 $\mu$m and about 180 $\mu$m.

10. The chocolate or compound coating of claim 1, having a moisture content of no more than about 5 weight percent.

11. The chocolate or compound coating of claim 1, having a moisture content of no more than about 2 weight percent.

* * * * *